United States Patent
Liu et al.

(10) Patent No.: US 6,694,077 B2
(45) Date of Patent: Feb. 17, 2004

(54) OPTICAL COLLIMATOR WITH MOLDING LENS

(75) Inventors: Qiang Liu, Shenzhen (CN); Mingbao Zhou, Shenzhen (CN); River Yang, Shenzhen (CN)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 0 days.

(21) Appl. No.: 10/163,822

(22) Filed: Jun. 5, 2002

(65) Prior Publication Data

US 2003/0138214 A1 Jul. 24, 2003

(30) Foreign Application Priority Data

Jan. 18, 2002 (TW) .................... 91200436 U

(51) Int. Cl.[7] .................... G02B 6/32; G02B 6/42
(52) U.S. Cl. .................... 385/47; 385/35; 385/79; 385/93; 385/73; 385/74; 385/33
(58) Field of Search .................... 385/31, 33–35, 385/47, 78–79, 74, 93

(56) References Cited

U.S. PATENT DOCUMENTS

| | | | | |
|---|---|---|---|---|
| 4,421,383 A | * | 12/1983 | Carlsen | 385/79 |
| 6,168,319 B1 | * | 1/2001 | Francis | 385/79 |
| 6,343,166 B1 | * | 1/2002 | Hellman et al. | 385/31 |
| 2002/0057873 A1 | * | 5/2002 | Wu et al. | 385/33 |

* cited by examiner

*Primary Examiner*—David V. Bruce
*Assistant Examiner*—Thomas Artman

(57) ABSTRACT

An optical collimator (10) includes an input optical fiber (11), an output optical fiber (12), a ferrule (13) receiving the input optical fiber and the output optical fiber therein, a molding lens (14), and a filter (15). The molding lens includes a solid cylindrical main body (141), and a pair of cylindrical protrusions (142, 143) respectively extending from opposite ends of the main body. The main body includes an inmost oblique end face (18), and an opposite aspherical end face (19). The ferrule is received in one protrusion and opposes the oblique end face. The filter is received in the other protrusion and opposes the aspherical end face.

18 Claims, 3 Drawing Sheets

OPTICAL COLLIMATOR WITH MOLDING LENS

BACKGROUND OF THE INVENTION

1. Field of the Invention

The present invention relates to optical collimators, and more particularly to an optical collimator having an integrated molding lens therein.

2. Description of the Prior Art

As optical fiber technology is being more broadly applied in the telecommunications, data communications and community antenna television (CATV) industries, the fiber optic component industry is now confronted with increasingly demanding requirements for good performance and high reliability. Currently, most design and manufacturing of in-line fiber optic components are based on optical collimators, which provide low-loss light transmission from the input fiber to the output fiber through an optical element. Optical collimators are basic building blocks of fiber optic components. The reliability and level of performance of fiber optic components depends heavily on the reliability and performance characteristics of their optical collimators.

A Graded Index (GRIN) lens is a popular optical element which is utilized in an optical collimator for collimating scattered light. As show in FIG. 1, a conventional optical collimator comprises an input optical fiber 1, an output optical fiber 2, a ferrule 3, a GRIN lens 4, a filter 5, an inner tube 6 and an outer tube 7. A through hole (not labeled) defined in the ferrule 3 receives the optical fibers 1, 2. The ferrule 3 and the GRIN lens 4 are aligned and fixed in the inner tube 6 with epoxy resin. The filter 5 is adhered to an end surface of the GRIN lens 4 with epoxy resin.

The conventional optical collimator has some disadvantages. First, the filter 5 is directly adhered onto the surface of the GRIN lens 4 with epoxy resin. During heating of the resin, the filter 5 is subjected to uneven heating. This changes and adversely affects performance of the filter 5. In addition, humidity created by the epoxy adversely affects performance of the optical collimator. Second, accurate alignment as between the ferrule 3 and the GRIN lens 4 depends on accurate formation of the inner tube 6. Therefore, the inner tube 6 must be made with unduly high precision. Third, the GRIN lens 4 is conventionally made by the ion exchange method. Therefore, the GRIN lens 4 must be further polished after initial formation. Furthermore, chemicals used in the ion exchange method are harmful to users and pollute the environment.

Therefore, an improved optical collimator that overcomes the above-described numerous disadvantages of the conventional optical collimator is desired.

SUMMARY OF THE INVENTION

Accordingly, an object of the present invention is to provide an inexpensive optical collimator having good optical performance.

Another object of the present invention is to provide an optical collimator that allows easy and precise fixing of its optical components.

A further object of the present invention is to provide an optical collimator that is environmentally friendly.

To achieve the above-mentioned objects, an optical collimator in accordance with a preferred embodiment of the present invention comprises an input optical fiber and an output optical fiber, a ferrule receiving the input optical fiber and the output optical fiber therein, a molding lens, and a filter. The molding lens comprises a solid cylindrical main body, and a pair of cylindrical protrusions respectively extending from opposite ends of the main body. The main body comprises an oblique end face, and an opposite aspherical end face. The ferrule is received in one protrusion and opposes the oblique end face. The filter is received in the other protrusion and opposes the aspherical end face.

Other objects, advantages and novel features of the invention will become more apparent from the following detailed description when taken in conjunction with the accompany drawings, in which:

DETAILED DESCRIPTION OF THE INVENTION

Figure 1:
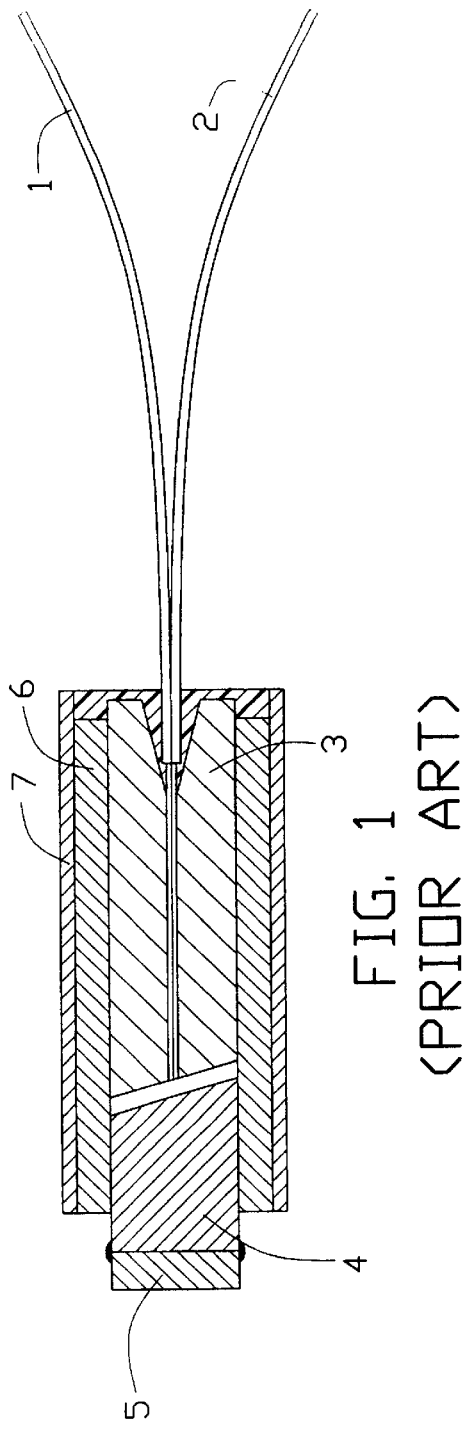
FIG. 1 is a schematic cross-sectional view of a conventional optical collimator.
Figure 2:
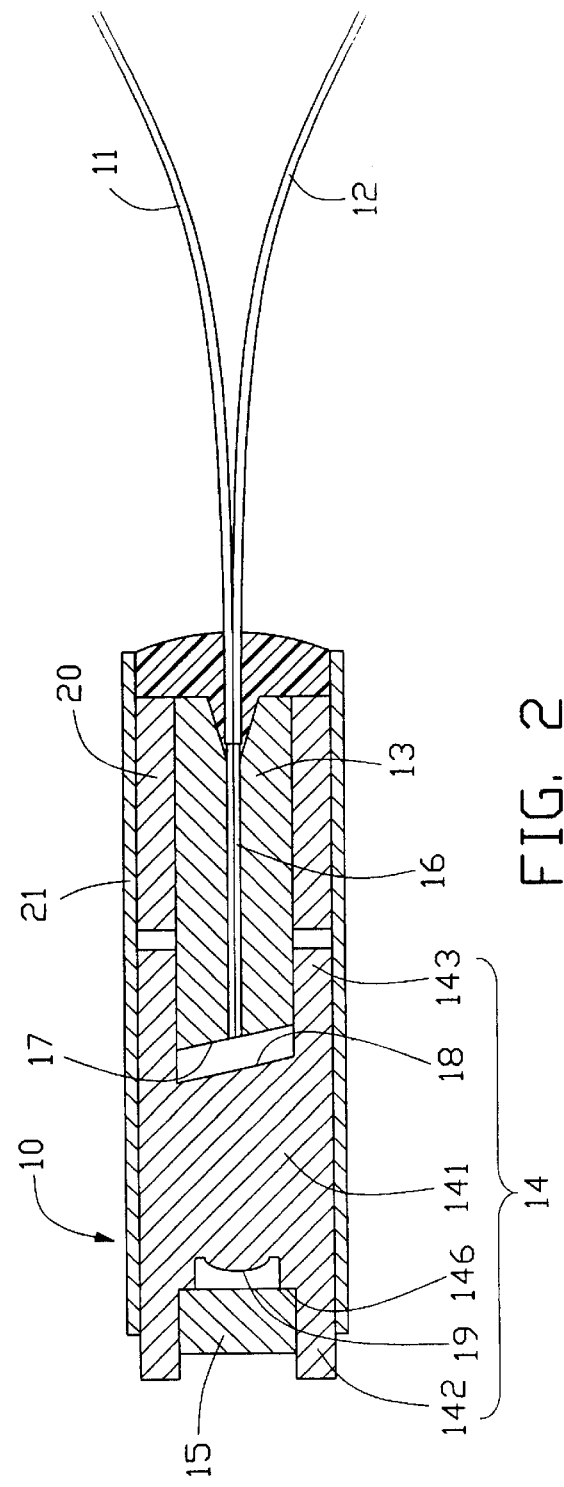
FIG. 2 is a schematic cross-sectional view of an optical collimator in accordance with a preferred embodiment of the present invention.

Referring to FIG. 2, an optical collimator 10 in accordance with a preferred embodiment of the present invention comprises an input optical fiber 11, an output optical fiber 12, a ferrule 13, a molding lens 14, a filter 15, an inner tube 20 and an outer sleeve 21.

The ferrule 13 has an inmost end 17, an opposite outmost end (not labeled), and a through hole 16 defined between the inmost end 17 and the outmost end. To improve optical performance, the inmost end 17 of the ferrule 13 and inner ends (not labeled) of the optical fibers 11, 12 are ground and polished to an oblique angle relative to an imaginary line that is perpendicular to a longitudinal axis of the ferrule 13. The angle is preferably between 6 and 8 degrees. A conical opening (not labeled) is defined in the outmost end of the ferrule 13, in communication with the through hole 16. The optical fibers 11, 12 are retained in the through hole 16 with epoxy resin.

Figure 3:
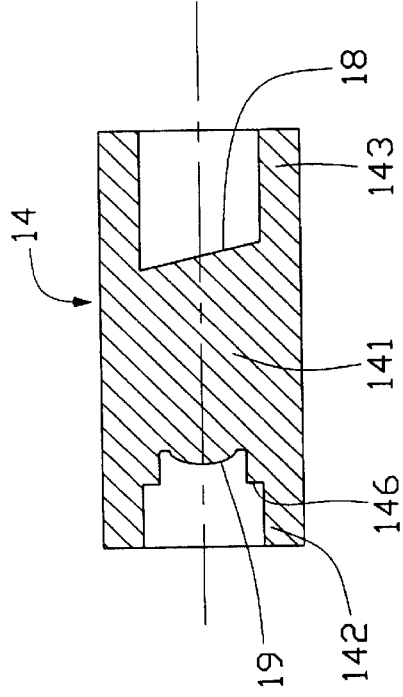
FIG. 3 is a schematic cross-sectional view of a molding lens of the optical collimator of FIG. 2.

Referring also to FIG. 3, the molding lens 14 is made of glass or another suitable material. The molding lens 14 comprises a solid cylindrical main body 141, and a pair of cylindrical protrusions 142, 143 extending from opposite ends of the main body 141 respectively. The main body 141 has an inmost oblique end face 18, and an opposite outmost aspherical end face 19. The oblique end face 18 is ground and polished so that it forms an oblique angle relative to an imaginary line that is perpendicular to a longitudinal axis of the molding lens 14. The angle is preferably between 6 and 8 degrees. The protrusion 142 extends from a periphery of the aspherical end face 19, and the protrusion 143 extends from a periphery of the oblique end face 18. The protrusion 142 forms an internal step 146. An internal diameter of the protrusion 142 at an outward side of the step 146 is greater than an internal diameter of the protrusion 142 at an inward side of the step 146. A length of the protrusion 142 at the outward side of the step 146 is greater than a length of the protrusion 142 at the inward side of the step 146. An internal diameter of the protrusion 143 is substantially equal to a diameter of the ferrule 13, to enable the protrusion 143 to secure the ferrule 13 therein.

The inner tube 20 is made of glass material. A length of the inner tube 20 is less than a length of the ferrule 13. An internal diameter of the inner tube 20 is substantially equal to the diameter of the ferrule 13, to enable the inner tube 20 to secure the ferrule 13 therein. The outer sleeve 21 is made of metallic material. An internal diameter of the outer sleeve 21 is substantially equal to an outer diameter of the inner tube 20.

Referring back to FIG. 2, in assembly, cladding (not labeled) of end portions of the optical fibers 11, 12 is removed to leave two exposed ends (not labeled) of the optical fibers 11, 12 respectively. The exposed ends are each uniformly coated with a film of epoxy resin. The optical fibers 11, 12 are inserted into the through hole 16 of the ferrule 13 via the conical opening, and secured in the ferrule 13. An outer circumferential surface of the ferrule 13 is uniformly coated with a film of epoxy resin. The combined ferrule 13 and optical fibers 11, 12 is inserted into the inner tube 20. A distance and orientation as between the inmost end 17 of the ferrule 13 and the oblique end face 18 of the molding lens 14 is adjusted. An inner end portion (not labeled) of the ferrule 13 is thus secured in the cylindrical protrusion 143 of the molding lens 14, and another portion of the ferrule 13 is thus secured in the inner tube 20. The filter 15 is uniformly coated with a film of epoxy resin, and inserted into the cylindrical protrusion 142 of the molding lens 14 until it abuts against the step 146. The filter 15 is thus secured in the cylindrical protrusion 142. Outer circumferential surfaces of the molding lens 14 and the inner tube 20 are each uniformly coated with a film of epoxy resin. The combined molding lens 14 and inner tube 20 is inserted into the outer sleeve 21 and secured therein. A gap (not labeled) is formed at an end of the outer sleeve 21 having the optical fibers 11, 12. The gap is sealed with epoxy resin.

Figure 4:
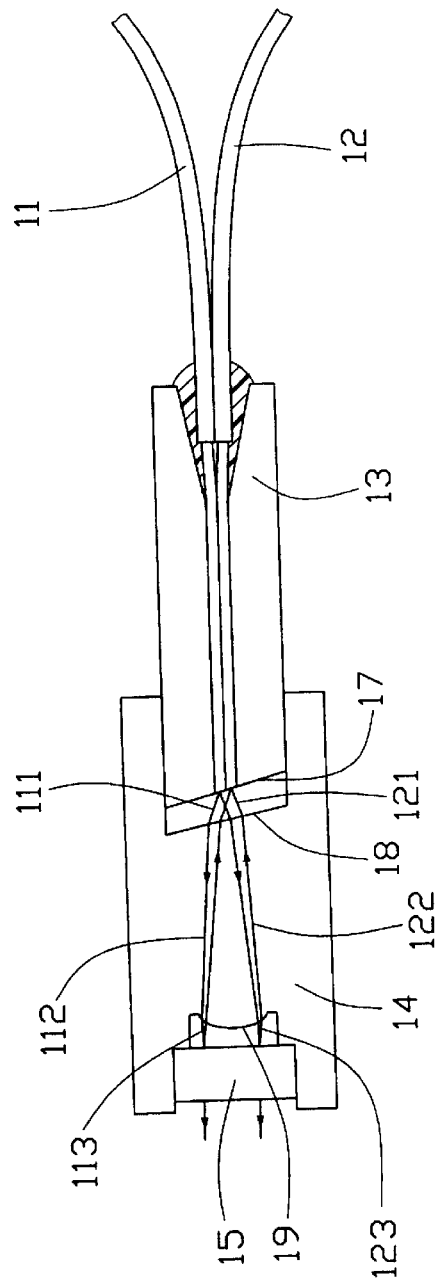
FIG. 4 is a schematic cross-sectional view of optical paths of the optical collimator of FIG. 2.

Referring to FIG. 4, a focal point (not labeled) of the molding lens 14 is located at the inmost end 17 of the ferrule 13. A light beam 111 emitted from the input optical fiber 11 is transmitted to the oblique end face 18 of the molding lens 14, and is refracted to become a light beam 112. The light beam 112 passes out through the aspherical end face 19 of the molding lens 14 to become a light beam 113. The light beam 113 propagates to the filter 15. The filter 15 reflects the light beam 113 as a light beam 123 to the aspherical end face 19. The light beam 113 passes through the aspherical end face 19 to become a light beam 122. The light beam 122 passes through the oblique end face 18, and is refracted to become a light beam 121. The light beam 121 is focused to a point on the inner end of the output optical fiber 12.

Figure 5:
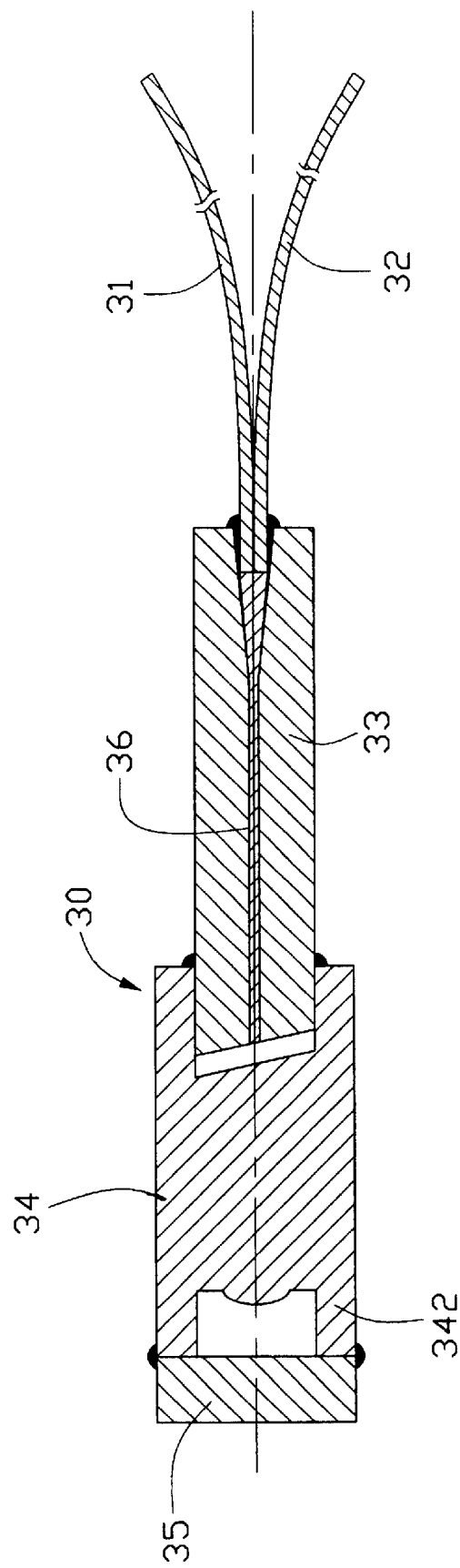
FIG. 5 is a schematic cross-sectional view of an optical collimator in accordance with an alternative embodiment of the present invention.

FIG. 5 shows an optical collimator 30 in accordance with an alternative embodiment of the present invention. The optical collimator 30 comprises two optical fibers 31, 32, a ferrule 33, a molding lens 34, and a filter 35. Compared with the optical collimator 10 of the preferred embodiment, the optical collimator 30 does not need the inner tube 20, the outer sleeve 21, or the step 146. Furthermore, the filter 35 is fixed to an outmost end of the molding lens 34, rather than within the molding lens 34. A uniform thin film of epoxy resin is applied on the optical fibers 31, 32, which are then inserted into a through hole 36 of the ferrule 33. The combined ferrule 33 and fibers 31, 32 is inserted into and secured in the molding lens 34. Epoxy resin is applied on an end surface of a protrusion 342 of the molding lens 34, and the filter 35 is adhered onto the end surface. A circumferential gap where the filter 35 adjoins the molding lens 34 is sealed with epoxy resin. A gap between a circumferential surface of the ferrule 33 and an end of the molding lens 34 is sealed with epoxy resin. Finally, a gap between the optical fibers 31, 32 and an outmost end of the ferrule 33 is sealed with epoxy resin.

The optical collimator 10 of the preferred embodiment of the present invention has the following advantages. The protrusions 142, 143 are integrated with the molding lens 14. Therefore the ferrule 13 is easily aligned and secured in the molding lens 14, and the filter 15 is readily secured in the molding lens 14. No epoxy resin is required between the filter 15 and any optically functional part of the molding lens 14. Accordingly, there are no uneven heating or humidity problems. In addition, the molding lens 14 can be formed as an integral high-precision unit that does not require further polishing. This reduces costs. Furthermore, material used to make the molding lens 14 is inexpensive, safe for users and environmentally friendly. The above-described benefits are equally applicable to the optical collimator 30 of the alternative embodiment of the present invention.

Further alternative embodiments of the present invention may include single fiber optical collimators as well as dual-fiber optical collimators, and may further include other similar optical devices.

It should be understood that various changes and modifications to the presently preferred embodiments described herein will be apparent to those skilled in the art. Such changes and modifications may be made without departing from the spirit and scope of the present invention and without diminishing the present invention's advantages. Thus, it is intended that such changes and modifications be covered by the appended claims.

What is claimed is:

1. An optical collimator comprising:
   an input optical fiber;
   an output optical fiber;
   a ferrule receiving the input optical fiber and the output optical fiber therein;
   a filter; and
   a molding lens comprising two protrusions respectively extending from opposite ends thereof, wherein the ferrule is received in one of the protrusions, the filter is received in the opposite protrusion, said opposite protrusion comprises an internal step, and the filter abuts the step such that precise optical alignment between the ferrule and the molding lens is ensured.

2. The optical collimator as claimed in claim 1, wherein the molding lens has an oblique end face, and said end face defines an angle in the range from 6 to 8 degrees relative to a line that is perpendicular to a longitudinal axis of the molding lens.

3. The optical collimator as claimed in claim 2, wherein the ferrule has an inmost end adjacent to the molding lens, and said inmost end defines an angle in the range from 6 to 8 degrees relative to a line that is perpendicular to a longitudinal axis of the ferrule.

4. The optical collimator as claimed in claim 2, wherein the protrusion receiving the ferrule extends from a periphery of the oblique end face of the molding lens.

5. The optical collimator as claimed in claim 1, wherein the molding lens has an aspherical end face.

6. The optical collimator as claimed in claim 5, wherein the protrusion receiving the filter extends from a periphery of the aspherical end face of the molding lens.

7. The optical collimator as claimed in claim 1, wherein the molding lens comprises two protrusions respectively extending from opposite ends thereof, the ferrule is received in one of the protrusions, and the filter is attached to an outmost end of the opposite protrusion.

8. An optical collimator comprising:

at least one optical fiber;

a ferrule receiving the at least one optical fiber therein;

a filter; and a molding lens comprising two protrusions respectively extending from opposite ends thereof wherein the ferrule is received in one of the protrusions, the filter is attached to an outmost end of the opposite protrusion such that precise optical alignment between the ferrule and the molding lens is ensured, and light emitted from the at least one optical fiber passes through the molding lens.

9. The optical collimator as claimed in claim 8, wherein the molding lens has an oblique end face, and said end face defines an angle in the range from 6 to 8 degrees relative to a line that is perpendicular to a longitudinal axis of the molding lens.

10. The optical collimator as claimed in claim 8, wherein the ferrule has an inmost end adjacent the molding lens, and said inmost end defines an angle in the range from 6 to 8 degrees relative to a line that is perpendicular to a longitudinal axis of the ferrule.

11. The optical collimator as claimed in claim 9, wherein the protrusion receiving the ferrule extends from a periphery of the oblique end face of the molding lens.

12. The optical collimator as claimed in claim 8, wherein the molding lens has an aspherical end face.

13. The optical collimator as claimed in claim 12, wherein said opposite protrusion extends from a periphery of the aspherical end face of the molding lens.

14. An optical collimator comprising:

a ferrule receiving at least one fiber therein;

a molded lens defining at one end a first cavity attachably receiving said ferrule therein; and a filter attached to another cavity at the other end of said molded lens and spaced from a curved surface of said molded lens; wherein said filter is axially inwardly offset from an end face of said other end.

15. The optical collimator as claimed in claim 14, wherein the molded lens comprises a solid cylindrical main body, and a pair of cylindrical protrusions extending from opposite ends of the main body respectively.

16. The optical collimator as claimed in claim 15, wherein the main body has an inmost oblique end face and an opposite outmost aspherical end face, and one of the protrusions extends from a periphery of the aspherical end face, and the other protrusion extends from a periphery of the oblique end face.

17. The optical collimator as claimed in claim 16, wherein one of the protrusions forms an internal step, and the filter abuts against the internal step, adjacent to the outmost aspherical end face.

18. The optical collimator as claimed in claim 17, wherein an internal diameter of the other protrusion is substantially equal to a diameter of the ferrule, for securing the ferrule in the protrusion.

* * * * *